(No Model.)
J. A. & C. F. FOSTER.
TOBACCO PLANT CUTTER.
No. 323,312. Patented July 28, 1885.
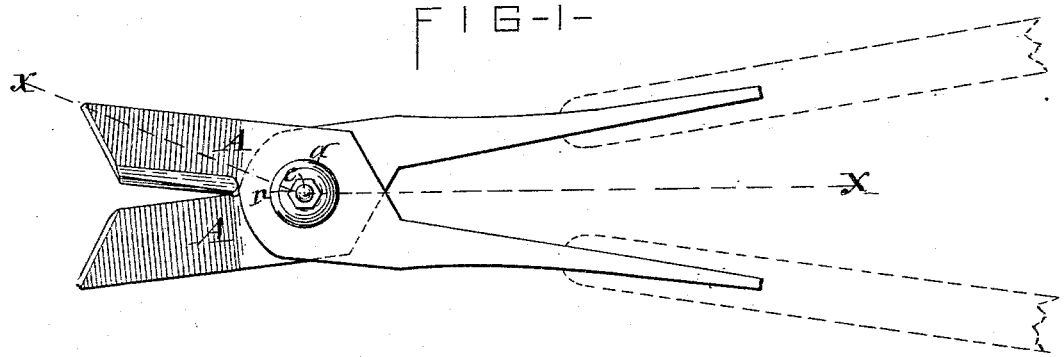
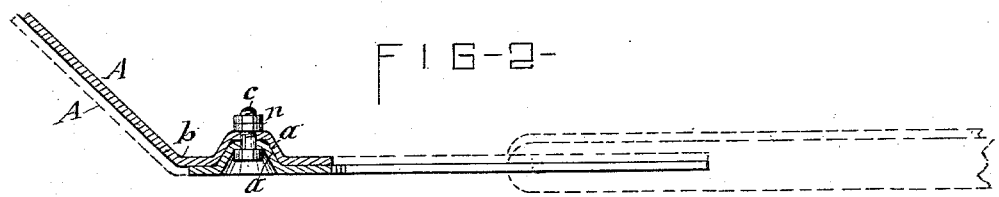
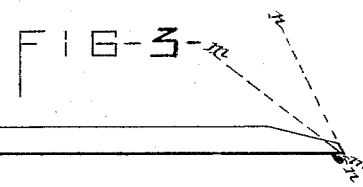
ATTEST—
Wm. C. Raymond
C. Bendixon
INVENTORS
James A. Foster
Charles F. Foster
by Bull, Laurs & Hey
Attys

UNITED STATES PATENT OFFICE.

JAMES A. FOSTER AND CHARLES F. FOSTER, OF FULTON, NEW YORK.

TOBACCO-PLANT CUTTER.

SPECIFICATION forming part of Letters Patent No. 323,312, dated July 28, 1885.

Application filed May 21, 1885. (No model.)

*To all whom it may concern:*

Be it known that we, JAMES A. FOSTER and CHARLES F. FOSTER, of Fulton, in the county of Oswego, in the State of New York, have invented new and useful Improvements in Tobacco-Plant Cutters, of which the following, taken in connection with the accompanying drawings, is a full, clear, and exact description.

This invention consists in a novel device for pivoting the shearing-blades to each other, so as to greatly relieve the coupling-bolt of strain, and at the same time bracing said blades, so as to enable them to better resist the torsional strain they are subjected to in the operation of cutting tobacco or other plants, and said device also imparting to the shears other important advantages, as hereinafter set forth.

The invention is fully illustrated in the annexed drawings, wherein Figure 1 is a plan view of our improved tobacco-plant cutter. Fig. 2 is a longitudinal section on line $x$ $x$, Fig. 1; and Fig. 3 is an enlarged end view of one of the shearing-blades, illustrating the variations in the bevel of the cutting-edge.

Similar letters of reference indicate corresponding parts.

A A denote the two shearing-blades, provided with the usual bent, $b$, to allow the operator to stand nearly or quite erect in the operation of cutting tobacco-plants. Said blades are usually pivoted to each other by simply a rivet or bolt passing through them.

In the operation of such implements it has been found that the pivot is unable to resist the torsional strain exerted by forcing the conversely-beveled cutting-edges of the two blades into opposite sides of the tobacco-plant, and in consequence thereof the free ends of the blades become crowded together, and frequently cause the cutting-edges thereof to cut into each other, and thus become injured and inoperative; and, furthermore, the pivot becomes rapidly worn, so as to loosen the blades and destroy the efficiency of the shears. To obviate these defects, we provide the blades with pivotal bearings $a$ $a$, which are integral with the blades, and made of the form of a boss projecting from one of the faces of one blade, and a socket on the adjacent side of the other blade, which socket coincides with and closely embraces the aforesaid boss, and thereby forms the pivot on which the blades swing. A coupling-bolt, $c$, passing through the axis of the said pivot, secures the two blades together. The aforesaid boss and socket we press or strike up from said blades by means of suitable dies, and thereby form on the blades annular braces, which serve to stiffen the same.

In order to admit of taking up the wear and tightening the pivotal joint we bevel the bearings $a$ $a$ to the form of frustums of cones, one of which enters the other, and coupling-bolt $c$ we provide with a nut, $n$, by which to draw the two frustums toward each other, so as to tighten the joint between them when required.

It will be observed that the aforesaid bearings form a pivot which relieves the coupling-bolt of strain, and is of large circumference, and thus capable of better resisting the torsional strain. Furthermore, they form around the pivot a cup-shaped receptacle for lubricant, and the joint between the bearings is protected from dust.

In the operation of cutting tobacco-plants or analogous plants the shears are liable to grasp stones lying near the stalk of the plant, and such accidents injure and frequently destroy the cutting-edges of the blades. To enable the blades to better withstand such collisions with stones, we turn the bevels of the cutting-edges from an acute angle at the points toward a right angle at the heels of the blades, as illustrated in Fig. 4 of the drawings, in which $m$ $m$ represent the bevel at the point, and $n$ $n$ the bevel at the heel, sufficient bevel being retained at the heel to allow said portion of the blades to make the first cut, the sharper forward portion of the blades completing the cut. The comparatively blunt portions of the cutting-edges will arrest the action of the shears when caught on a stone without materially injuring the shears.

Having described our invention, what we claim as new, and desire to secure by Letters Patent, is—

1. Shears having their blades pivoted to each other by a boss struck up from the face of one blade and entering a socket pressed in the adjacent face of the other blade, and a coupling-bolt passing through the center of said pivot, substantially as set forth.

2. In a shearing or cutting implement, the combination of cutting-blades pivoted to each other by frustums of cones struck up from said blades, one of said frustums entering the other, with a coupling-bolt passing through the axis of the frustums, and a tightening-nut on said bolt, substantially as described and shown.

In testimony whereof we have hereunto signed our names and affixed our seals, in the presence of two attesting witnesses, at Fulton, in the county of Oswego, in the State of New York, this 14th day of May, 1885.

JAMES A. FOSTER. [L. S.]
  CHARLES F. FOSTER. [L. S.]

Witnesses:
  HENRY E. NICHOLS,
  LANGDON C. FOSTER.